US00RE45015E

(19) United States
(12) Reissued Patent
Uchida et al.

(10) Patent Number: US RE45,015 E
(45) Date of Reissued Patent: Jul. 15, 2014

(54) IMAGE HEATING APPARATUS USING FLEXIBLE SLEEVE

(71) Applicant: Canon Kabushiki Kaisha, Tokyo (JP)

(72) Inventors: Michio Uchida, Susono (JP); Yuusuke Shimizu, Susono (JP); Kazushi Ino, Sunto-gun (JP)

(73) Assignee: Canon Kabushiki Kaisha, Tokyo (JP)

(21) Appl. No.: 13/692,479

(22) Filed: Dec. 3, 2012

Related U.S. Patent Documents

Reissue of:
(64) Patent No.: 7,283,780
Issued: Oct. 16, 2007
Appl. No.: 11/400,410
Filed: Apr. 10, 2006

(30) Foreign Application Priority Data

Apr. 14, 2005 (JP) ..... 2005-117199

(51) Int. Cl.
*G03G 15/20* (2006.01)

(52) U.S. Cl.
USPC ..... 399/329

(58) Field of Classification Search
USPC ..... 399/329; 198/806, 810.03, 807; 193/37; 492/47
See application file for complete search history.

(56) References Cited

U.S. PATENT DOCUMENTS

| | | | | |
|---|---|---|---|---|
| 1,038,514 | A * | 9/1912 | Anderson | 193/37 |
| 5,149,941 | A | 9/1992 | Hirabayashi et al. | |
| 5,210,579 | A | 5/1993 | Setoriyama et al. | |
| 5,235,395 | A | 8/1993 | Ishiwata | |
| 5,257,078 | A | 10/1993 | Kuroda | |
| 5,525,775 | A | 6/1996 | Setoriyama et al. | |
| 6,748,192 | B2 | 6/2004 | Izawa et al. | |
| 6,794,611 | B2 | 9/2004 | Kataoka et al. | |
| 6,937,837 | B2 | 8/2005 | Takeuchi et al. | |
| 6,944,420 | B2 * | 9/2005 | Kanamori et al. | 399/329 |
| 2002/0146259 | A1 | 10/2002 | Zhou et al. | |
| 2002/0168202 | A1 * | 11/2002 | Izawa et al. | 399/329 |
| 2003/0206756 | A1 * | 11/2003 | Kanamori et al. | |
| 2005/0185994 | A1 | 8/2005 | Inada et al. | |
| 2007/0048043 | A1 | 3/2007 | Chang | |

FOREIGN PATENT DOCUMENTS

| | | |
|---|---|---|
| JP | 63-313182 | 12/1988 |
| JP | 63-313182 A | 12/1988 |
| JP | 4-44075 | 2/1992 |
| JP | 4-44075 A | 2/1992 |

(Continued)

*Primary Examiner* — Susan Lee
(74) *Attorney, Agent, or Firm* — Fitzpatrick, Cella, Harper & Scinto

(57) ABSTRACT

An image heating apparatus includes a flexible sleeve, a sliding member for sliding on the inner periphery of the sleeve, and a back-up member for forming a nip portion together with the sliding member through the sleeve. A recording material for bearing an image is heated while being held and conveyed by the nip portion, and a regulation member is set by facing the edge surface of the sleeve in the generatrix direction to regulate the movement of the sleeve in the generatrix direction, the regulation member having a regulation surface with which the edge surface of the sleeve contacts when the sleeve moves in the generatrix direction. The regulation surface of the regulation member has a curved-surface area in which a line when the regulation surface is cut at a virtual plane almost parallel with the nip portion is a curved line expanded toward the edge surface of the sleeve. Thereby, an image heating apparatus is provided which is able to restrain deterioration of the durability of the flexible sleeve.

6 Claims, 10 Drawing Sheets

(56) References Cited

FOREIGN PATENT DOCUMENTS

| | | | |
|---|---|---|---|
| JP | 4-204980 | | 7/1992 |
| JP | 4-204980 | A | 7/1992 |
| JP | 5-208750 | | 8/1993 |
| JP | 5-208750 | A | 8/1993 |
| JP | 10-10893 | | 1/1998 |
| JP | 10-10893 | A | 1/1998 |
| JP | 11-15303 | | 1/1999 |
| JP | 11-15303 | A | 1/1999 |
| JP | 2002-231419 | | 8/2002 |
| JP | 2002-231419 | A | 8/2002 |
| JP | 2003-45615 | | 2/2003 |
| JP | 2003-45615 | A | 2/2003 |
| JP | 2003-156954 | | 5/2003 |
| JP | 2003-156954 | A | 5/2003 |
| JP | 2006065056 | A * | 3/2006 |

* cited by examiner

AMENDED

IMAGE HEATING APPARATUS USING FLEXIBLE SLEEVE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an image heating apparatus for heating an image borne by a recording material by passing the recording material through a fixing nip portion N between a heat member and a pressuring member to cause the material to be held and conveyed. Particularly, the present invention relates to an image heating apparatus to be preferably mounted on an image forming apparatus such as a copying machine or printer as an image heating-fixing device.

More minutely, the present invention includes a flexible sleeve-shaped rotor, a sliding member set to the inside of the rotor to slide on the inner periphery of the rotor, a pressuring member for forming a nip portion together with the sliding member by holding the rotor and a regulation member set by facing the end of the rotor to regulate movement of the rotor in a generatrix direction, which heats a recording material bearing an image by the nip portion while conveying the recording material.

2. Related Background Art

The heating roller system shown in FIG. 15 has been used so far as an image heating apparatus to be mounted on a copying machine or printer as a fixing device. This system is basically constituted of a metallic heating roller 202 including a halogen heater 201 and an elastic pressuring roller 203 pressure-welded to the heating roller 202. Moreover, a recording medium S bearing an unfixed toner image t as a member to be heated is introduced into the fixing nip portion N (fixing nip portion) of the roller pair 202 and 203 to hold, convey and pass the recording medium S. Thereby, the toner image t is heated, pressured and fixed.

However, the fixing device according to the heating roller system requires a lot of time in order to raise the temperature of roller surface up to a fixing temperature because the rollers respectively have a large heat capacity. Therefore, to quickly execute the image output operation, it is necessary to keep the roller surface at a certain degree of temperature also when the apparatus is not used.

Therefore, a film-heating-system heating apparatus for fixing a developer to a recording medium by using a film heated by a heater is proposed as an on-demand type heating apparatus.

This film-heating-system heating apparatus normally has a thin heat-resistant film (e.g. polyimide) and a heater (heat generation member) fixed to one side of the film. Moreover, the apparatus has a pressure roller set to the other side of the film by facing a heater to contact a member to be heated with the heater through the film.

Moreover, when using the pressure roller as a fixing device, a recording medium making the fixing nip portion N (fixing nip portion) formed by pressure welding between the heater and pressure roller at both sides of the film form and bear a toner image is introduced and passed. Thereby, the visualized image bearing body face of the recording medium is heated by the heater through the film, heat energy is supplied to an unfixed image, toner is softened and melted and the image is heated and fixed.

In the case of the above film-heating-system heating apparatus, it is possible to use a low-heat-capacity heater as a heat generation member. Therefore, it is possible to save power and shorten the wait time compared to the case of a conventional heat-roller-system or belt-heating-system apparatus.

Moreover, it is recently proposed to prevent luster irregularity of an image by setting an elastic layer to the outside of a fixing film and uniforming the contact between a recording material having minute irregularity and the film. Furthermore, an apparatus is proposed which secures the on-demand property of a fixing device by using a metallic film having a heat conductivity higher than that of the polyimide film (e.g. stainless steel) in order to prevent deterioration of heat conductivity caused as a harmful result of setting the elastic layer.

In the case of these film-heating-system fixing devicees, lateral shift to the generatrix direction (thrust direction) may occur in a film and it is difficult to regulate the lateral shift force. Particularly, when a displacement of the parallelism between a pressure roller and the film or the right-left difference of applied pressure increases, a strong hook-approach force is generated and a strong stress is applied to the end of the film. Therefore, the end of the film may be damaged.

Therefore, it is proposed to regulate lateral shift by loosely winding a film, decreasing the lateral shift force of the film, and receiving the film end by the film-edge part regulation surface (hereafter also referred to as "regulation face") of a flange in Japanese Patent Application Laid-Open No. H04-044075 and Japanese Patent Application Laid-Open No. H04-204980. When a fixing film is flexible enough and loose pulling is possible, it is possible to avoid film damage by the configuration disclosed in the above documents. However, in the case of a fixing belt using a metallic film, the fixing film itself has a high stiffness and lacks in flexibility. Therefore, when the shift of parallelism between the above pressure rollers and film or the difference between right and left applied pressures arises and a strong lateral shift force is generated and a film locally receives a stress on the lateral shift regulation surface, cracks may arise from an end.

SUMMARY OF THE INVENTION

The object of the present invention is to solve the above problem and its object is to provide an image heating apparatus capable of preventing deterioration of the durability of a flexible sleeve.

Another object of the present invention is to provide an image heating apparatus including a flexible sleeve, a sliding member for sliding on an inner periphery of said flexible sleeve, a back-up member for forming a nip portion together with said sliding member through said flexible sleeve, wherein a recording material for bearing an image is heated while being held and conveyed by the nip portion, and a regulation member provided with opposing to the edge surface of said sleeve in a generatrix direction of said sleeve, for regulating a movement of said sleeve in the generatrix direction of said sleeve, said regulation member having a regulation surface with which the edge surface of said sleeve contacts when said sleeve moves in the generatrix direction, wherein the regulation surface of said regulation member has a curved-surface area in which a line when the regulation surface is cut in a virtual plane substantially parallel to the nip portion is a curved line convexed toward the edge surface of said sleeve.

A further object of the present invention is to provide an image heating apparatus including a flexible sleeve, a sliding member for sliding on the inner periphery of said sleeve, a back-up member for forming a nip portion together with said sliding member through said sleeve, wherein a recording material for bearing an image is heated while being held and conveyed by the nip portion, and a regulation member provided opposing to the edge surface of said sleeve in a generatrix direction of said sleeve, for regulating a movement of said sleeve in the generatrix direction of said sleeve, said regulation member having a regulation surface with which the edge surface of said sleeve contacts when said sleeve moves in the generatrix direction, wherein the regulation surface of said regulation member has a curved-surface area in which the generatrix direction of the regulation member intersects with a virtual plane including the nip portion.

A still further object of the present invention will become apparent by reading detailed description while referring to the accompanying drawings.

DETAILED DESCRIPTION OF THE PREFERRED EMBODIMENTS

Embodiment 1

(1) Embodiment of Image Forming Apparatus

Figure 1:
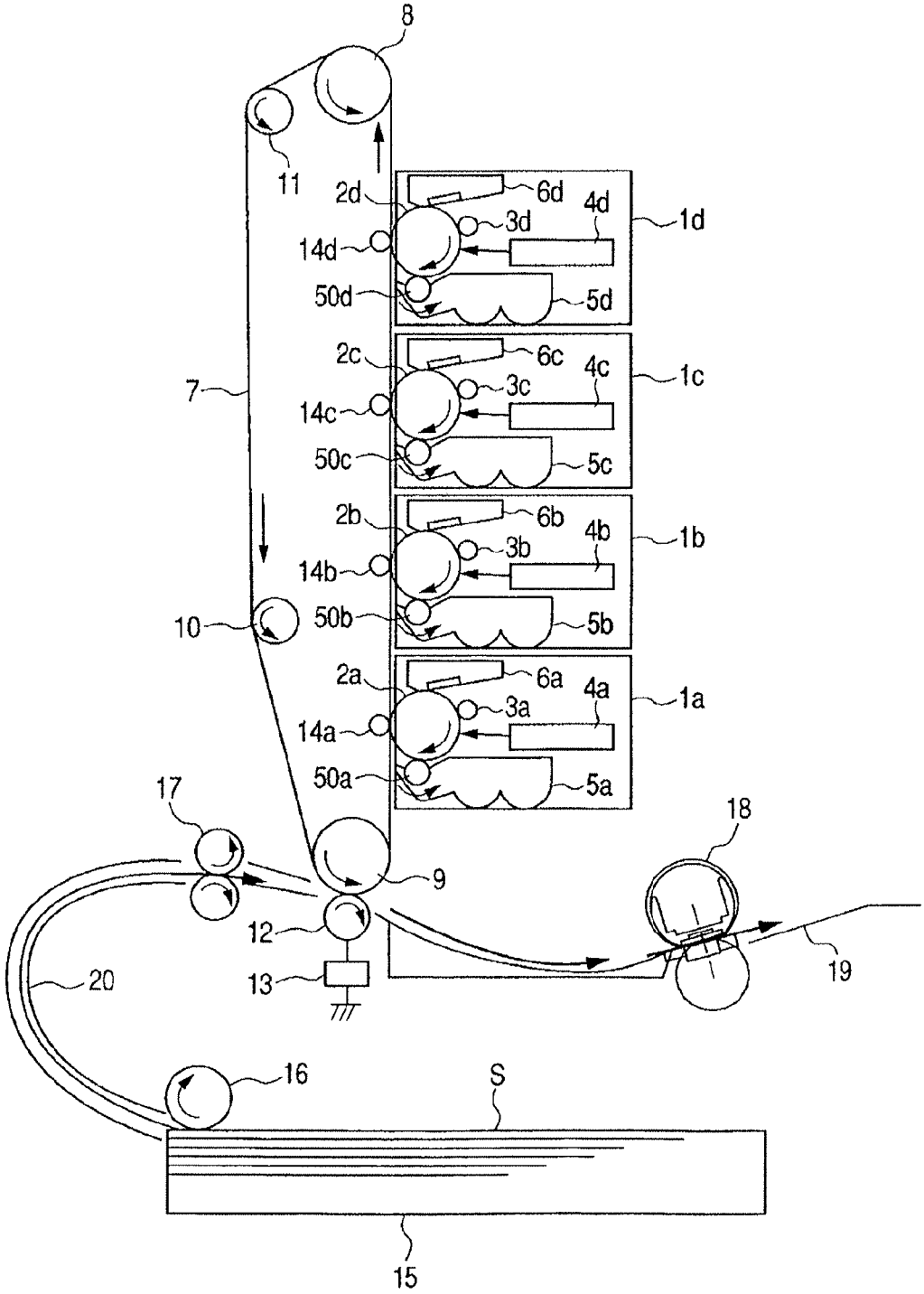
FIG. 1 is a schematic view of an image forming apparatus which mounts an image heating apparatus of the present invention.

An embodiment of an image forming apparatus using an image heating apparatus of the present invention as a fixing device is described below by referring to FIG. 1.

The image forming apparatus of this embodiment is a full-color image forming apparatus using an electrophotographic system. The apparatus has four process stations 1a to 1d arranged on an substantial straight line in a substantial vertical direction to the setting face of the apparatus to form four different color images (magenta, cyan, yellow and black) and a conveying route 20 for conveying sheets S serving as recording materials (recording media).

The process stations 1a to 1d have photosensitive drums 2a to 2d for bearing a latent image. Moreover, the process stations 1a to 1d have electrification rollers 3a to 3d for uniformly electrifying the photosensitive drums 2a to 2d and exposure devices 4a to 4d for applying a laser beam on the photosensitive drums 2a to 2d to form a latent image. Furthermore, the process stations 1a to 1d have developing means 5a to 5d for developing the latent image formed on the photosensitive drums 2a to 2d by toners of corresponding colors (magenta, cyan, yellow and black) to visualize it. Furthermore, the process stations 1a to 1d have cleaning devices 6a to 6d for removing remaining toners from the photosensitive drums 2a to 2d. These are arranged around the photosensitive drums 2a to 2d.

The developing means 5a to 5d have developing sleeves 50a to 50d for bearing toners. The developing sleeves 50a to 50d are supported by keeping predetermined intervals from corresponding photosensitive drums 2a to 2d. A developing bias is applied between the photosensitive drums 2a to 2d and developing sleeves 50a to 50d.

An intermediate transfer belt 7 is suspended and strained on a driving roller 8, a driven roller 9 and belt tension rollers 10 and 11 under tension and rotated in the direction shown by arrows in FIG. 1. The intermediate transfer belt 7 is conveyed along the arrangement direction of the process stations 1a to 1d. Toner images of various colors on the photosensitive drums 2a to 2d are successively transferred to the surface of the intermediate transfer belt by primary transfer means 14a to 14d through the stations. Thereby, an unfixed full-color toner image is synthesized and formed on the outer face of the intermediate transfer belt 7.

The sheets S are stored in a sheet feed cassette 15 set to the lower portion of the apparatus. Then, the sheets S are separated and sent one by one from the sheet feed cassette 15 by a sheet feed roller 16 and fed to a pair of registration rollers 17. The pair of the registration rollers 17 sends the fed sheets S between the intermediate transfer belt 7 and a secondary transfer roller 12.

The secondary transfer roller 12 set so as to face the driven roller 9 contacts with the lowermost surface of the intermediate transfer belt 7. The secondary transfer roller 12 holds and conveys the sheets S passing between the roller 12 and the intermediate transfer belt 7. A bias is applied to the secondary transfer roller 12 from a high-voltage power supply 13 (bias means). Thereby, a toner image on the intermediate transfer belt is secondary-transferred to the sheets S passing between the secondary transfer roller 12 and the intermediate transfer belt.

The sheets S to which a toner image is transferred are sent to a fixing device 18. In the fixing device 18, the above sheets S are thermally pressured and the toner image is fixed on the sheets S as a permanent fixed image.

The sheets S to which an image is fixed by the fixing device 18 are discharged to a discharge tray 19 at the outside of the fixing device 18 from the fixing device 18.

(2) Fixing Device (Image Heating Apparatus) 18

Figure 2:
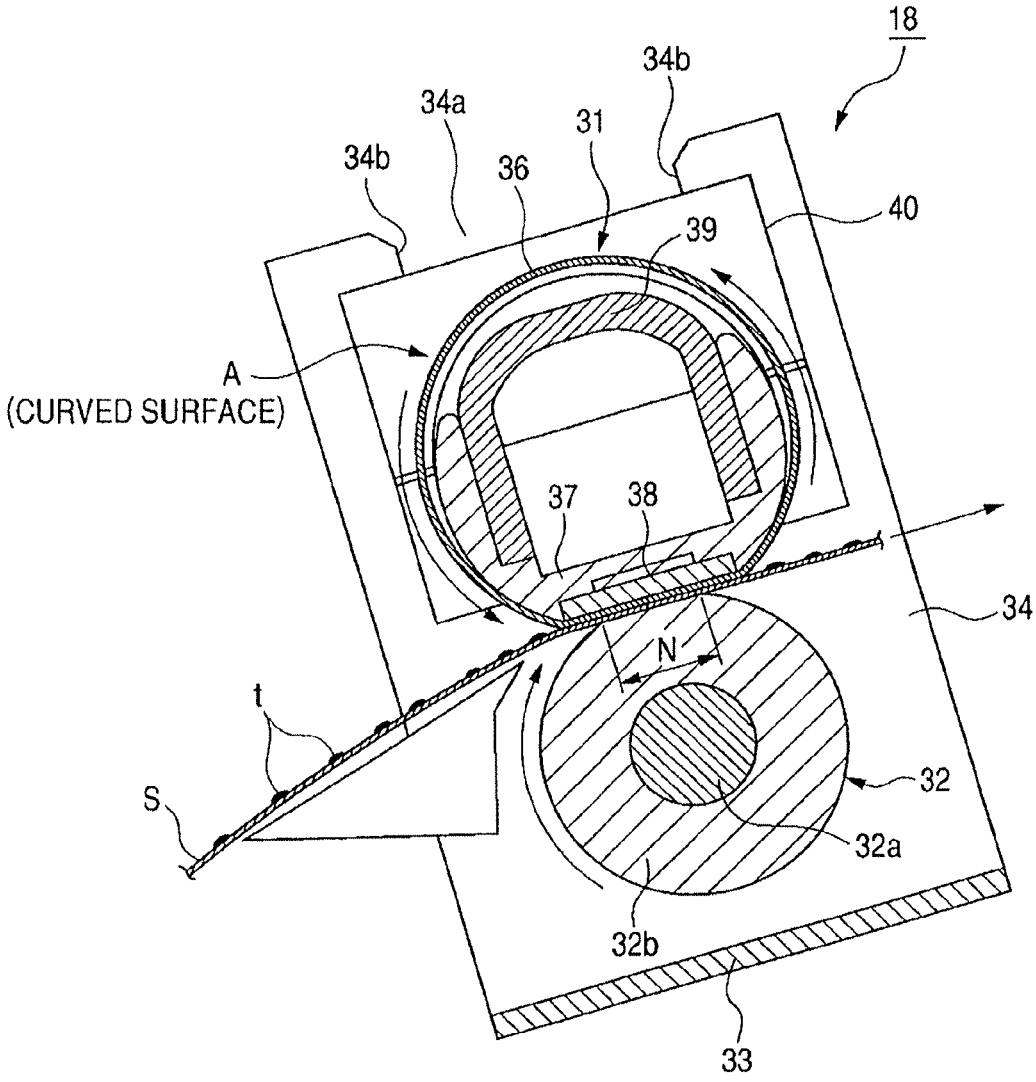
FIG. 2 is an enlarged crossing side schematic view of an essential portion of a fixing device.
Figure 3:
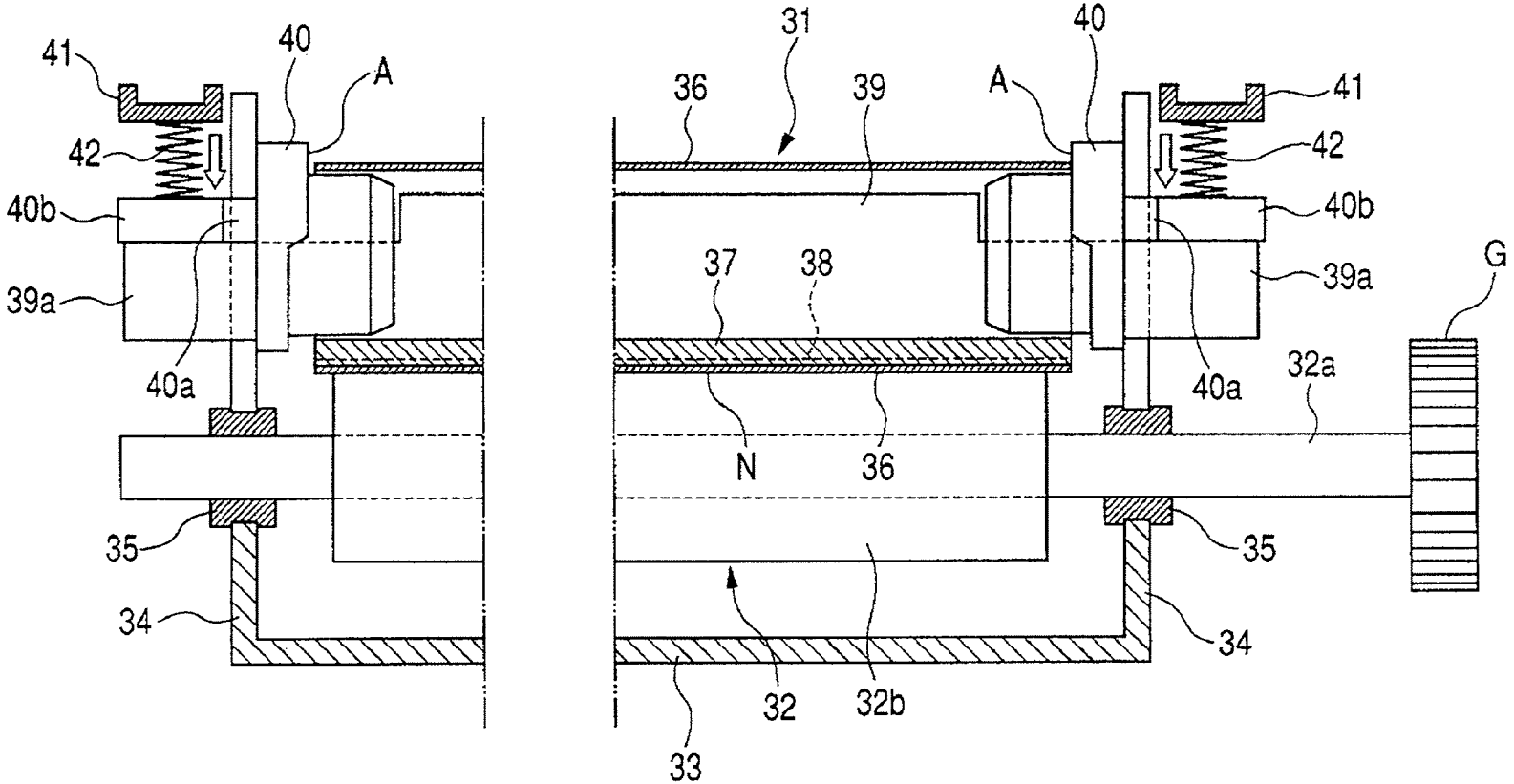
FIG. 3 is an enlarged longitudinal front schematic view of a fixing device in which a part of the fixing device in the longitudinal direction is omitted.

FIG. 2 is an enlarged crossing side schematic view of an essential portion of the fixing device 18 and FIG. 3 is an enlarged longitudinal front schematic view of the fixing device 18 whose middle portion is omitted. For apparatus component members in the following description, a longitudinal direction or horizontally long denotes a direction orthogonal to the moving direction of a recording material in a recording-material conveying face. Width direction or width denotes the moving direction of a recording material.

In the fixing device 18, a film assembly 31 as a heating member (a fixing member) and a pressure roller 32 serving as a backup member are arranged in vertically parallel between right and left side plates 34 of an apparatus frame 33.

The pressure roller 32 is constituted of a cored bar 32a and an elastic layer 32b of silicone rubber or fluorocarbon rubber formed like a roller concentrically around the cored bar. It is also possible to form a mold release layer of PFA, PTFE or FEP on the elastic layer 32. In the case of this pressure roller 32, both edge surfaces of the cored bar 32a are rotatably supported between right and left side plates 34 of the apparatus frame 33 through a bearing member 35. Reference character G denotes a drive gear fixed to one edge surface of the cored bar 32a of the pressure roller. A torque is transferred to the drive gear G from a not-illustrated driving mechanism portion and the pressure roller 32 is rotated.

The film assembly 31 is an assembly of a flexible sleeve 36 serving as a flexible rotor, guide member 37 for guiding the flexible sleeve from the inside, ceramic heater 38 (hereafter referred to as heater) serving as heating means for heating the flexible sleeve 36, reinforcement stay (fixing stay) 39 and right and left fixing flanges 40 serving as regulation members for regulating the generatrix (thrust) directional movement of the flexible sleeve 36.

Figure 4:
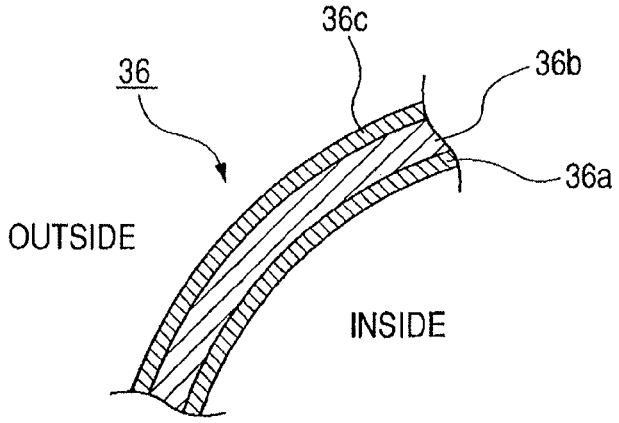
FIG. 4 is a sectional schematic view showing the layer configuration of a flexible sleeve.

In the case of this embodiment, as shown by the layer configuration schematic view in FIG. 4, the flexible sleeve 36 is flexible and constituted of a metallic film layer 36a, elastic layer 36b and mold release layer 36c from the inside toward the outside. The heat capacity of the flexible sleeve 36 for unit area is approx. 0.1 $J/cm^2 \cdot K$.

The guide member 37 is a horizontally long member having a tube shape with a generally semicircular cross section and having rigidity, heat resistance, and heat insulating property, and is formed of liquid-crystal polymer, phenol resin, PPS or PEEK. The guide member 37 serves as a rotational guide of the flexible sleeve 36 loosely outer-fitted to the guide member 37. Moreover, the guide member 37 also serves as a heater holder for heat-insulating and holding the heater 38. Furthermore, the guide member 37 serves as a pressure member.

The heater 38 has a high-insulating and preferable heat-conductive ceramic substrate such as alumina or aluminum nitride (AlN) or high heat-resistant resin substrate of polyimide, PPS or liquid-crystal polymer as a heater substrate. Moreover, a current-carrying heat-generating resistor layer made of silver palladium (Ag/Pd), $RuO_2$ or $Ta_2N$ is formed like a line or thin band having a thickness of approx. 10 μm and a width of approx. 1-5 mm through screen printing or the like on the surface of the heater substrate along the longitudinal direction. The heater 38 is set along the longitudinal direction of the guide member below the guide member 37. The temperature of the heater 38 quickly rises when power is supplied from a not-illustrated power feed portion to the current-carrying heat-generating resistor layer. Then, the heater temperature is detected by a not-illustrated temperature sensor and supply of power from the power feed portion to the current-carrying heat-generating resistor layer is controlled so that the heater is maintained at a predetermined temperature by a control portion (not illustrated).

The reinforcement stay 39 is a horizontally-long rigid member having a U-shaped cross section.

Then, the flexible sleeve 36 is loosely applied to the outside of the guide member 37 to whose lower face the heater 38 is set and the reinforcement stay 39 is inserted into the guide member 37. Right and left fixing flanges 40 are fitted to right and left outward extension arm portions 39a of the reinforcement stay 39. Thus, the film assembly 31 is assembled.

Figure 5:
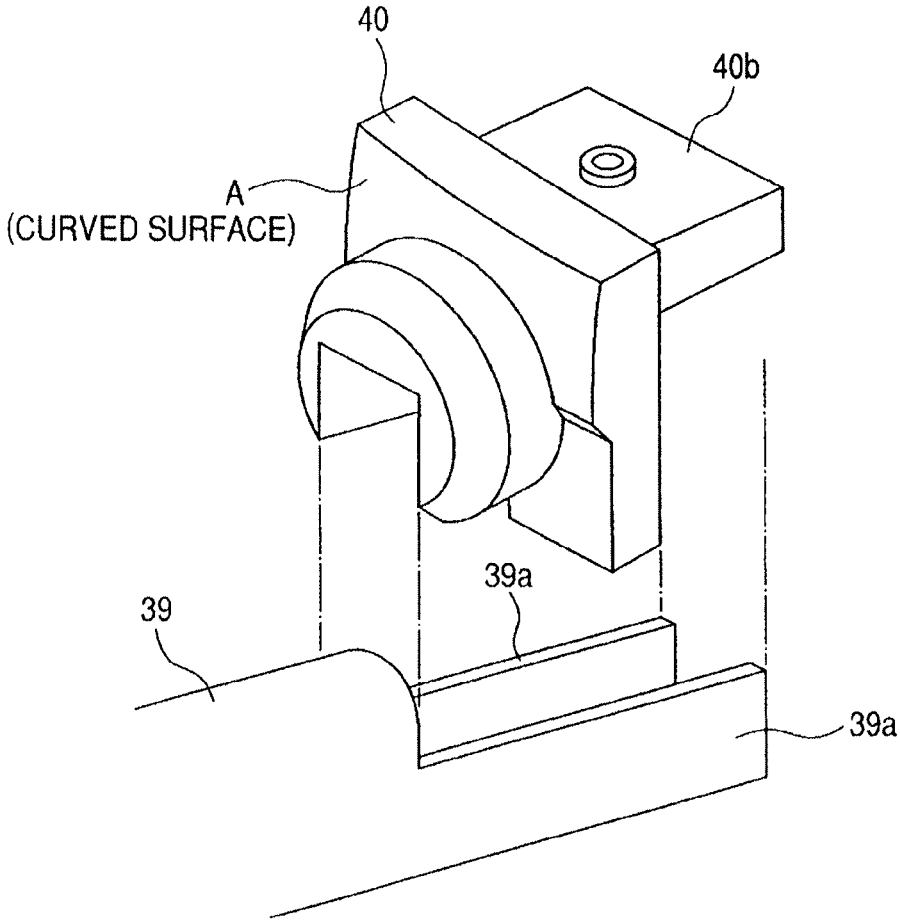
FIG. 5 is a perspective schematic view showing a state of separating a fixing flange 40 from a reinforcement stay 39.

FIG. 5 is a perspective view of the fixing flange 40 at one edge surface and right and left outward extension arm portions 39a of the reinforcement stay 39.

Figure 6:
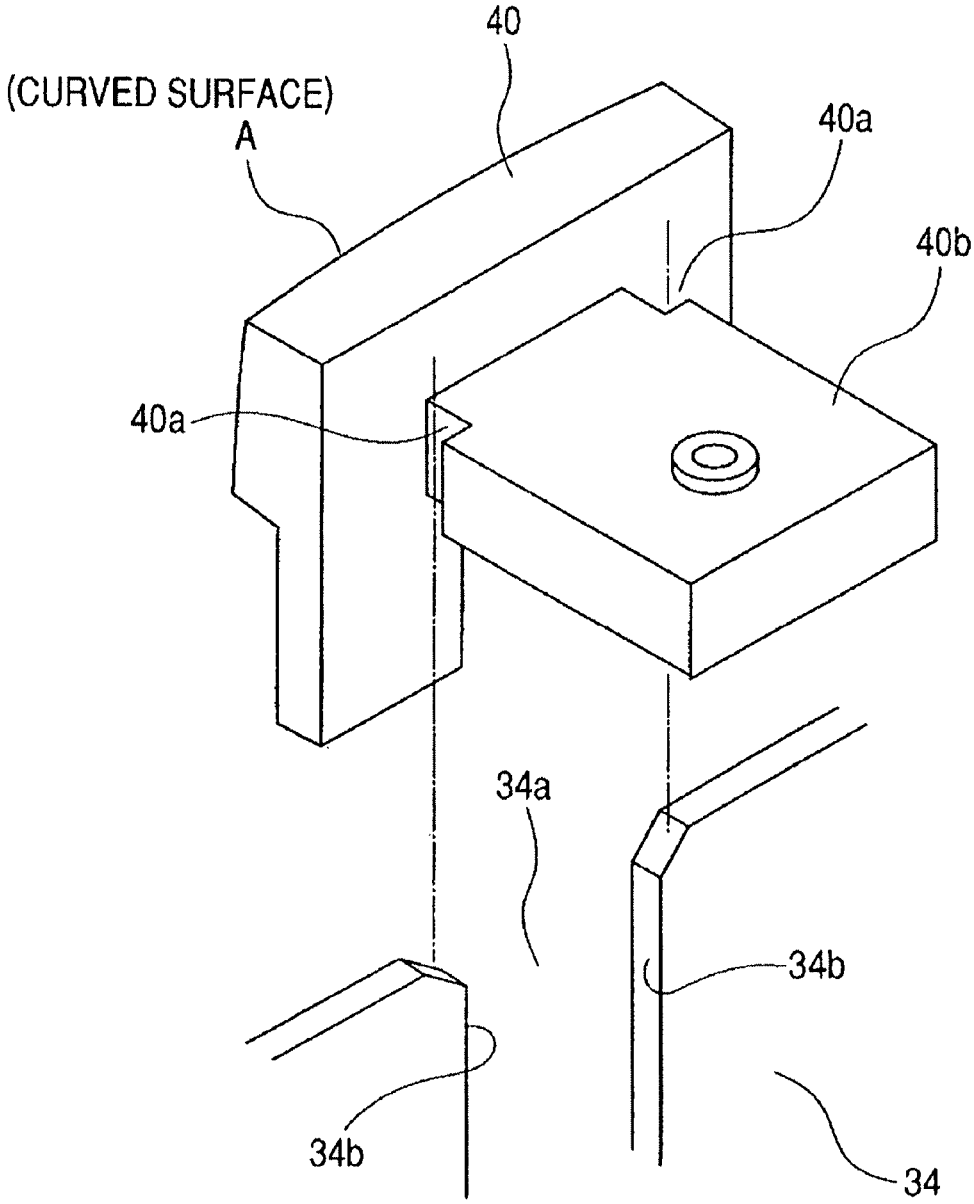
FIG. 6 is a perspective schematic view showing an engagement relation between a longitudinal groove portion 40a formed on the fixing flange 40 and the longitudinal marginal portion 34b of a longitudinal guide slit 34a formed on the side plate 34 of an apparatus frame.

The film assembly 31 is set to the upper side of the pressure roller 32 in substantial parallel with the pressure roller 32 with the heater 38 side facing down to set the film assembly 31 between right and left side plates 34 of the apparatus frame 33. In the case of the right and left fixing flanges 40, the longitudinal groove portions 40a set to the right and left flanges 40 are engaged with longitudinal marginal portions 34b of longitudinal guide slits 34a set to the right and left side plates 34 of the apparatus frame 33 (refer to FIG. 6).

Then, a pressure spring 42 is set between pressure portions 40b of the right and left fixing flanges 40 and the pressure arm 41. Thereby, the heater 38 is pressured at a predetermined pressure against the upper face of the pressure roller 32 at both sides of the flexible sleeve 36 through the right and left fixing flanges 40, the reinforcement stay 39 and the guide member 37. The fixing nip portion (nip portion) N having a predetermined width is formed by the pressure because the heater 38 is pressure-welded to the upper face of the pressure roller 32 at both sides of the flexible sleeve 36 against the elasticity of the flexible sleeve 36 and elasticity of the pressure roller 32. In the case of the fixing nip portion N, the flexible sleeve 36 is held between the heater 38 and the elastic pressure roller 32 and bent in accordance with the flat face at the lower face of the heater 38 and the inside of the flexible sleeve 36 closely contacts with the flat face at the lower face of the heater 38.

Thus, a torque is transferred to the drive gear G of the pressure roller 32 from a not-illustrated driving mechanism portion and the pressure roller 32 is rotated at a predetermined speed clockwise in FIG. 2. A torque acts on the flexible sleeve 36 in accordance with the friction force between the pressure roller 32 and the flexible sleeve 36 at the fixing nip portion N in accordance with the rotation of the pressure roller 32. Thereby, the inside of the flexible sleeve 36 rotates by following the rotation of the pressure roller 32 counterclockwise in FIG. 2 around the guide member 37 while closely contacting with and sliding on the lower face of the heater 38 (pressure roller driving type).

In the case of the fixing device of this embodiment, the above heater 38 is set inside the flexible sleeve 36 serving as a rotor, and is a sliding member for forming the nip portion together with the pressure roller 32 serving as a pressure member at both sides of the flexible sleeve 36.

When the flexible sleeve 36 is rotated in accordance with the rotation of the pressure roller 32, the heater 38 is turned on, the heater temperature is raised to a predetermined temperature and the temperature is controlled, the sheet S serving as a recording material is introduced. That is, the sheet S bearing unfixed toner image t is introduced between the flexible sleeve 36 of the fixing nip portion N and the pressure roller 32 and the toner-image bearing side of the sheet S closely contacts with the outer face of the flexible sleeve 36 at the fixing nip portion N and the fixing nip portion N is held and conveyed together with the flexible sleeve 36. In this holding and conveying process, the sheet S is heated by the heat of the flexible sleeve 36 heated by the heater 38 and the unfixed toner image t on the sheet S is heated and pressured on the sheet S and melted and fixed. The sheet passing through the fixing nip portion N is curvature-separated from the face of the flexible sleeve 36 and discharged and conveyed.

(3) Fixing Flange 40

The pressure roller 32 and flexible sleeve 36 to be set to the fixing device are not always parallel to each other but a crossing angle may be present between the two due to a tolerance for fabrication. For example, component tolerances of right and left pressure springs 41 are also one of the causes of generating the crossing angle and lead to the imbalance between right and left pressures applied to the fixing nip portion and a crossing angle arises between the pressure roller 32 and the flexible sleeve 36. When fabricating components used for the fixing device and assembling these components, various tolerances are overlapped other than the component tolerance of the pressure spring 41. Therefore, a crossing angle easily arises between the flexible sleeve 36 and the pressure roller 32 and a phenomenon (lateral shift) arises in which the flexible sleeve 36 rotates and slowly moves in the thrust direction due to the crossing angle. The lateral shift of the flexible sleeve 36 is received by the regulation surface A of a edge part (an edge surface) of the flexible sleeve of the fixing flange 40 to regulate the flexible sleeve position in the generatrix direction of the flexible sleeve.

Figure 11:
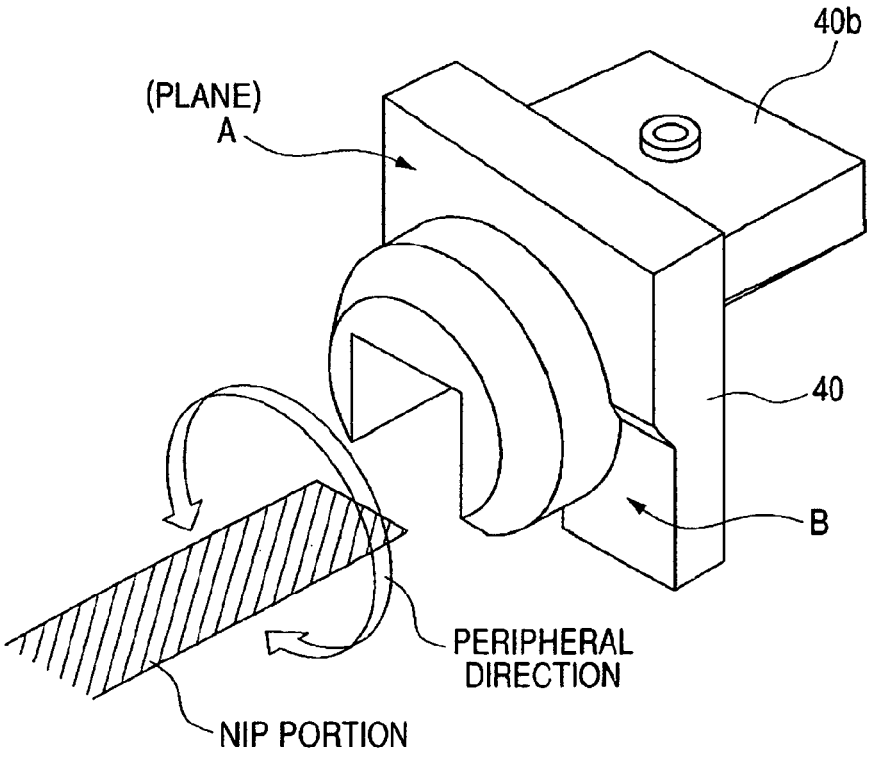
FIG. 11 PRIOR ART
FIG. 11 is a perspective view of a conventional fixing flange whose sleeve edge part regulation surface is a plane.

The case of a conventional fixing flange 40 is described below by referring to FIGS. 11 to 14. In the case of the conventional fixing flange 40, the edge part regulation surface A is plane as shown in FIG. 11. The edge part regulation surface A is not set nearby the fixing nip portion in the sleeve circumferential direction but it is set to an area farthest from the fixing nip portion. The portion of the fixing flange 40 corresponding to the vicinity of the sleeve-circumference-directional nip portion is more concaved than the regulation surface A as shown in FIG. 11B so that it does not contact with the flexible-sleeve edge surface E (refer to FIG. 12). This is because the flexible sleeve 36 is strongly constrained by the nip portion formed by the pressure roller 32 and heater 38 at the nip portion but it has no flexibility. Therefore, when the flexible sleeve 36 is pressed against the flange 40 at this portion, a local deforming stress arises and edge-surface breakdown of the sleeve easily occurs.

By the above reason, the flange 40 has the regulation surface A in only a portion facing a circular-arc area opposite to the fixing nip portion when almost halving the circular edge surface E on a virtual plane almost parallel with the face of the fixing nip portion N, that is, a circular-arc area farthest from the fixing nip portion in the sleeve circumference direction in the edge-surface E (circular) of the flexible sleeve 36.

Figure 12:
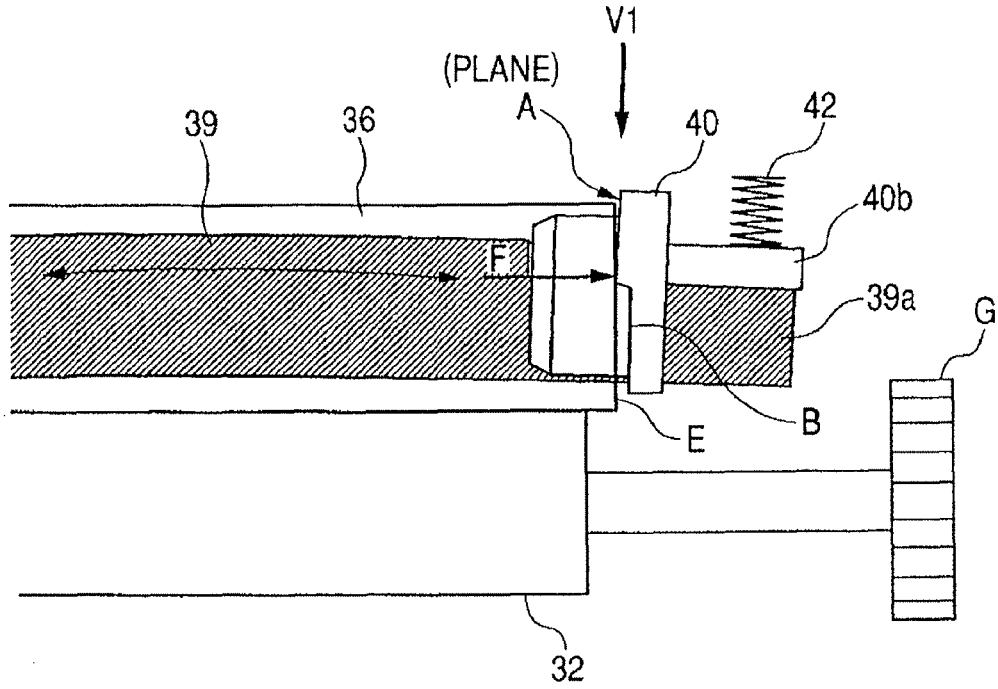
FIG. 12 is an enlarged longitudinal section schematic view of a fixing device using a fixing flange whose sleeve edge part regulation surface is a plane at one edge surface.
Figure 13:
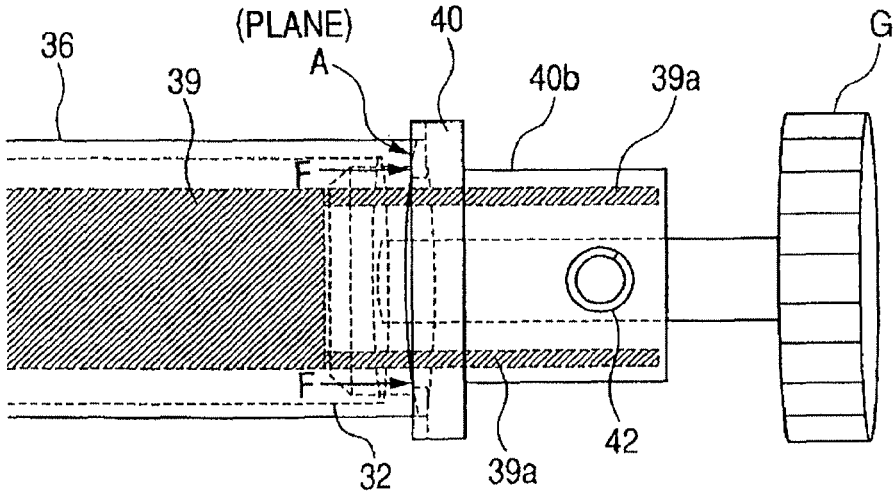
FIG. 13 is an illustration viewed from the direction of the arrow V1 in FIG. 12, which shows how the force of a flexible sleeve is applied to the edge part regulation surface of a flange when the reinforcement stay 39 is curved.
Figure 14:
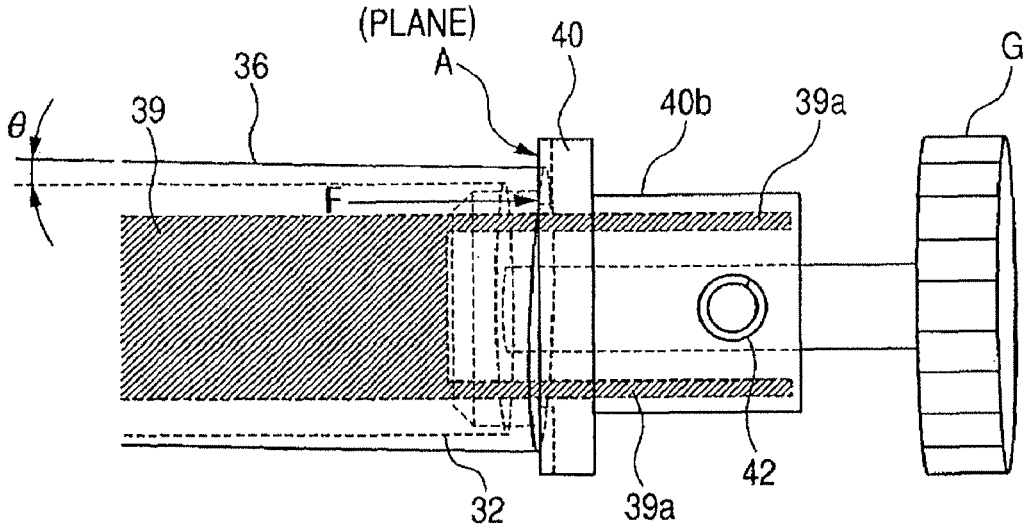
FIG. 14 is an illustration viewing the longitudinal-directional edge surface of a fixing device from the direction of the arrow V1 in FIG. 12, which shows how the force of a flexible sleeve is applied to the edge part regulation surface of a flange when a flexible sleeve and a pressure roller have a crossing angle.
Figure 15:
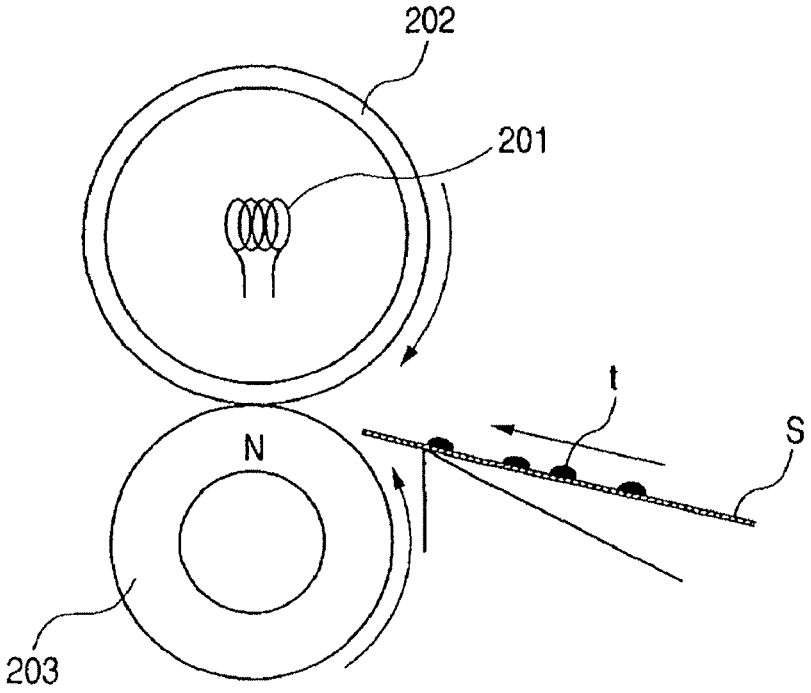
FIG. 15 is a schematic view of a configuration of a heat-roller-system fixing device.

However, there is a case in which not only a crossing angle to the pressure roller 32 of the flexible sleeve 36 but also the curvature of the reinforcement stay 39 due to the pressure of the pressure spring 42 or tilt of the fixing flange 40 may be present. In this case, it is found that a range in which the edge part regulation surface A contacts with the sleeve edge surface E is narrow and local as shown in FIGS. 12, 13, and 14 and edge-surface breakdown of the sleeve may occur. FIG. 12 shows a state in which the reinforcement stay 39 is deflected by the force of the pressure spring 42. Under this state, the edge surface E of the sleeve 36 and regulation surface A of the flange 40 become a state close to point contact. FIG. 13 is an illustration viewed from the direction of the arrow V1 in FIG. 12. FIG. 14 shows a state in which the sleeve 36 does not vertically contact with the regulation surface A of the flange 40 because the crossing angle θ is present between the flexible sleeve 36 and the pressure roller 32 when viewed from the direction of the arrow V1 in FIG. 12.

Then, a mechanism is described in which edge-surface breakdown of the flexible sleeve 36 occurs.

As described above, because of the crossing angle between the flexible sleeve 36 and the pressure roller 32, a force approaching to the generatrix direction to the flexible sleeve 36 is generated and the flexible sleeve 36 is sent to right or left generatrix direction while rotating. The flexible sleeve 36 contacts with the planar edge part regulation surface A of the fixing flange 40 shown in FIG. 11, generatrix-directional movement stops and flexible sleeve 36 continuously rotates while receiving a certain force from the contact face.

FIG. 12 shows an illustration in which the fixing flange 40 fitted and fixed to the reinforcement stay 39 due to the curvature of the reinforcement stay 39 tilts from the flexible sleeve 36 and under this state, the flexible sleeve 36 rotates while receiving a certain force F from the edge part regulation surface A. In this case, when the fixing flange 40 tilts as shown in FIG. 12, the planar edge part regulation surface A tilts, the contact between the flexible sleeve 36 and the edge part regulation surface A becomes local as shown in FIG. 12 and contacts in the circumferential direction at a minute length.

FIG. 13 viewed from the V1 direction in FIG. 12 shows a state in which the regulation surface A of the flange locally contacts with two places of the edge surface of the flexible sleeve 36. When a force acting in the thrust direction of the flexible sleeve 36 is locally received by the regulation surface A, apprehensiveness that the flexible-sleeve edge surface is broken increases.

Moreover, FIG. 14 shows a contact state between the flexible sleeve 36 and the edge part regulation surface A when a crossing angle occurs between the flexible sleeve 36 and the pressure roller 32. In FIG. 13, the flexible sleeve 36 contacts with the edge part regulation surface A at two places. However, because the flexible sleeve 36 tilts from the pressure roller 32, the number of contact places becomes one. Therefore, a local internal stress arises at the sleeve edge surface compared to the case of FIG. 13 and apprehensiveness of edge-surface breakdown of the flexible sleeve 36 increases.

Moreover, also when the fixing flange 40 tilts from the longitudinal direction of the pressure roller due to assembling backlash of the fixing flange 40, pressure is locally received at one point similarly to the case of FIG. 14 (illustration is omitted).

Therefore, this embodiment uses a configuration in which a local force does not easily act by curving the flexible-sleeve edge part regulation surface A of the fixing flange 40 like a circular arc (convex curved surface to flexible sleeve edge surface).

That is, the edge part regulation surface A of the fixing flange 40 is formed like a circular arc as shown in FIGS. 5 to 10. The flange is different from that shown in FIG. 11 only in the shape of the regulation surface A.

Figure 7A:
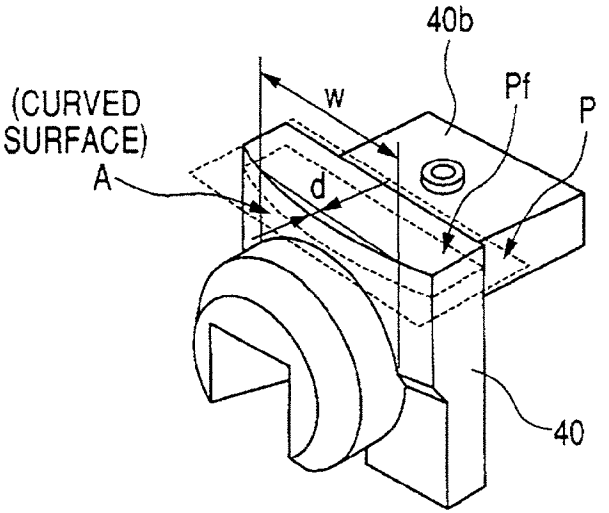
FIG. 7A is a perspective view of a fixing flange in which a sleeve edge part regulation surface is a curved face.
Figure 7B:
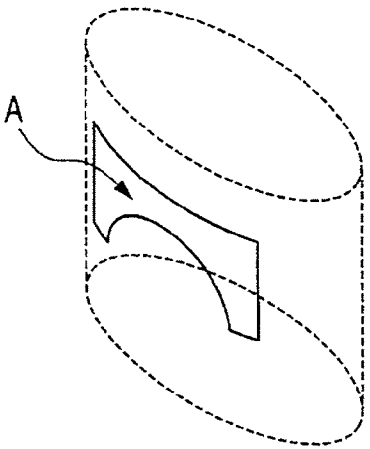
FIG. 7B is a perspective view of a fixing flange in which a sleeve edge part regulation surface is a part of an elliptic cylinder surface and the sleeve edge part regulation surface is a curved surface.
Figure 7C:
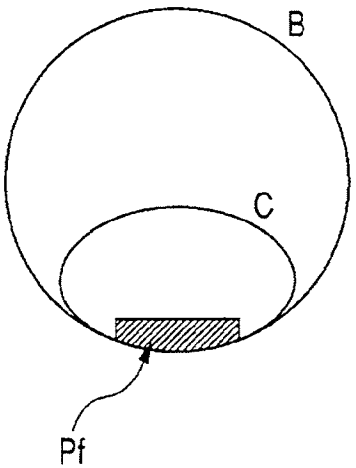
FIG. 7C is an illustration for explaining a fixing flange in which the shape of a circular arc when cutting a sleeve edge part regulation surface at a plane almost parallel with a fixing nip is approximate to an ellipse or circle and the sleeve edge part regulation surface is a curved surface.

FIG. 7A is a perspective view of the fixing flange 40, showing edge part regulation surface A curved like a circular arc, contactable width w, and curved value d. FIG. 7B shows that the edge part regulation surface A is a part of the surface of an elliptic cylinder. That is, FIG. 7B shows that the shape of the edge part regulation surface is a part of a circular cylinder or elliptic cylinder almost vertically standing on a recording-sheet passing face (virtual plane including nip portion). FIG. 7C shows a cross section Pf obtained by cutting the regulation surface at a plane P (plane parallel with virtual plane) almost parallel with the face of the nip portion N shown in FIG. 7B. That is, FIG. 7C shows that the cross section obtained by cutting the edge part regulation surface A at virtual plane almost parallel with the nip portion N is a part of the circumferential face of the circle B or ellipse C. The circular arc of the edge part regulation surface A shown by the cross section is approximate to a part of the ellipse C or circle B as shown in FIG. 7C and is constituted so as to coincide with a state when diagonally viewing the flexible sleeve 36. Thus, the regulation surface A of the regulation flange (regulation member) 40 has a curved-surface area in which a line when cutting the regulation surface A at a virtual plane substantially parallel with the nip portion N becomes a curved line inflated toward the edge surface E of the flexible sleeve 36. Moreover, the regulation surface A of the regulation flange 40 has a curved-surface area whose generatrix direction intersects with a virtual plane including the nip portion N.

Figure 8:
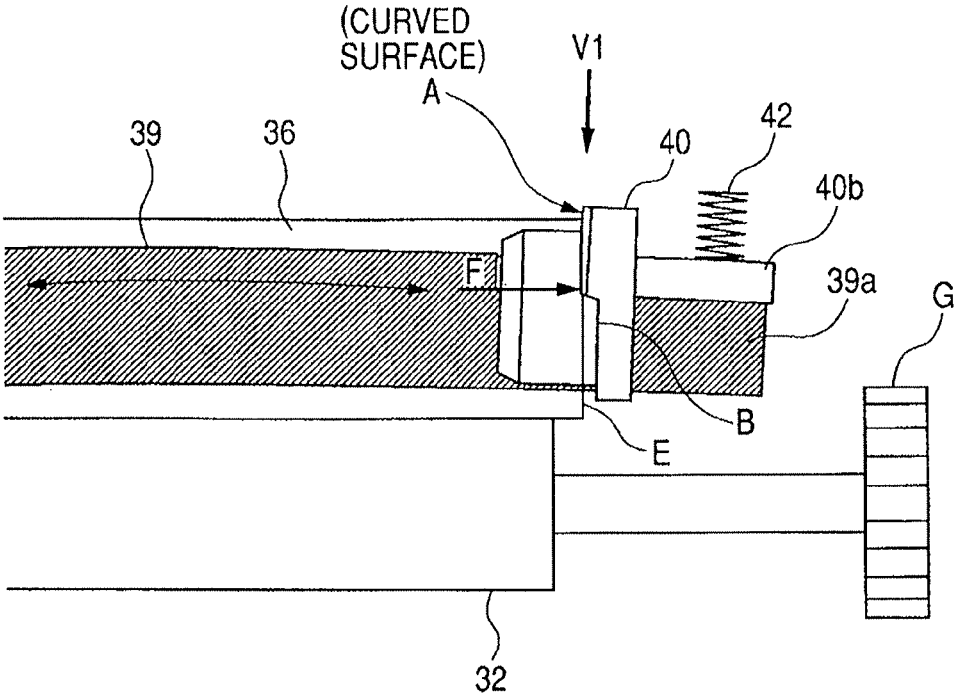
FIG. 8 is an enlarged longitudinal section schematic view of a fixing device using a fixing flange whose sleeve edge part regulation surface is a curved surface at one edge surface.
Figure 9:
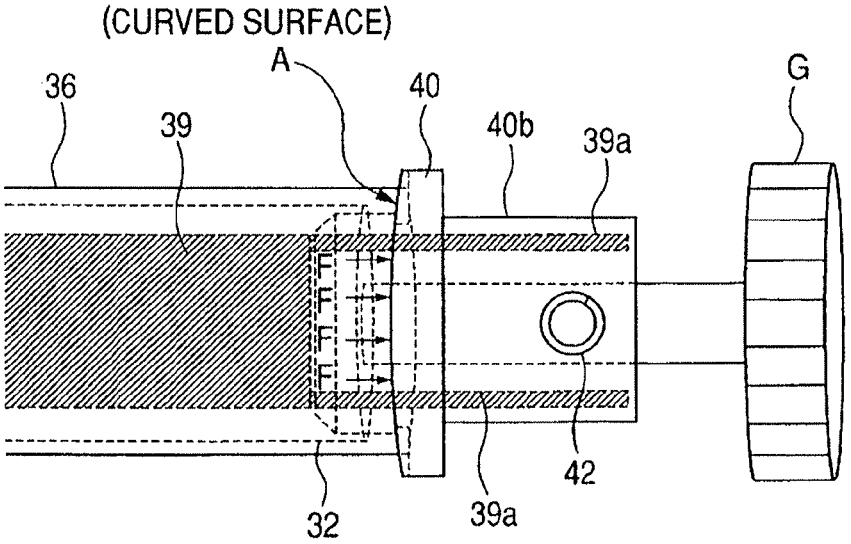
FIG. 9 is an illustration viewed from the direction of the arrow V1 in FIG. 8, which shows how the force of a flexible sleeve is applied to the edge part regulation surface of a flange when the reinforcement stay 39 is curved.
Figure 10:
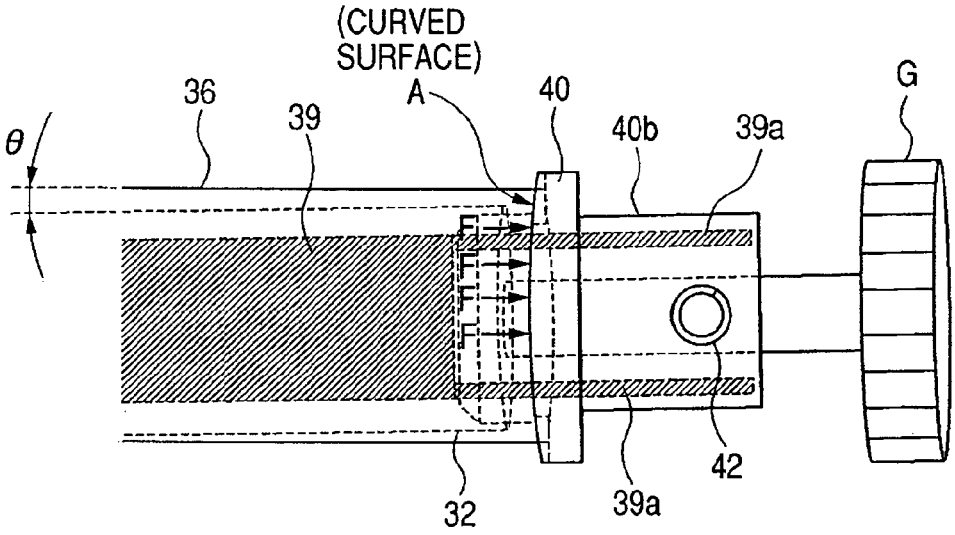
FIG. 10 is an illustration when viewing the longitudinal-directional edge surface of a fixing device from the direction of the arrow V1 in FIG. 8, which shows how the force of a flexible sleeve is applied to the edge part regulation surface of a flange when a flexible sleeve and a pressure roller have a crossing angle.

By using this configuration, even when the reinforcement stay 39 is curved and the fixing flange 40 tilts as shown in FIGS. 8 and 9 or the flexible sleeve 36 has a crossing angle from the pressure roller 32 as shown in FIG. 10, it is possible to widen the contact range between the sleeve edge surface E and the regulation surface A. Therefore, the risk that the flexible sleeve 36 locally receives a stress decreases and it is possible to avoid the local deformation of flexible sleeve edge surface and prevent edge surface breakdown from occurring.

Therefore, to set the curved value, experiments are performed. Table 1 shows experiment results.

TABLE 1

| | Curved value d (mm) | Number of durable sheets reaching edge part breakdown |
|---|---|---|
| Contactable width w = 20 (mm) | 0 | 30k to 50k |
| | 0.1 | 70k to 120k |
| | 0.2 | 200k to 250k |
| | 0.3 | 150k to 200k |
| | 0.4 | 100k to 150k |

Table 1 shows a relation between the curved value d when setting the contactable width w to 20 mm and the service life of a fixing device until reaching edge part destruction of a sleeve. Reference characters w and d denote the lengths shown in FIGS. 7A to 7C. To clarify the effect by an experiment, the curved value of the reinforcement stay 39, tilt of the fixing flange 40, and crossing angle with the pressure roller 32 of the flexible sleeve 36 are set to values larger than those of a product fabricated in accordance with the normal quality standard.

From these results, it is clarified that a configuration curved like a circular arc realizes a more preferable service life to edge part destruction than a case where the edge part regulation surface A is a plane. However, a curved value depends on one of the contactable range w and curved value d, contour of the flexible sleeve 36, deflection value of the reinforcement stay 39 due to pressure of a pressure spring and crossing angle with the pressure roller 32 generated in the flexible sleeve 36 and changes in accordance with one of these conditions. Moreover, when the curve value is too large, it is shown that the durability of a sleeve may lower and is excluded from values shown in this table.

Moreover, it is shown by an embodiment that the edge part regulation surface A is a part of the surface of a circular cylinder or elliptic cylinder. However, the edge part regulation surface A can be applied to a part of a conical surface and a part of a spherical surface. Also in the case of these shapes, the regulation surface A of the regulation flange (regulation member) 40 has a curve-surface area in which a line when the regulation surface A is cut at a virtual plane almost parallel with the nip portion N becomes a curved line inflated toward the edge surface E of the flexible sleeve 36.

Moreover, in the case of the above embodiment, the flexible sleeve 36 uses a sleeve having a heat capacity for unit area of approx. 0.1 $J/cm^2 \cdot K$. However, the flexible sleeve 36 is not restricted to the above sleeve. It is also possible to use a polyimide film having a very small heat capacity (for example, thickness of 50 μm and heat capacity for unit area of 0.01 $J/cm^2 \cdot K$). Also in this case, it is possible to realize a long service life to sleeve edge part destruction.

[Others]

(1) The heating means 37 for heating the flexible sleeve 36 serving as a rotor is not restricted to the ceramic heater of the above embodiment. It is also possible to use heating means such as a nichrome wire, an electromagnetic-induction heat generating member such as an iron piece, or a PTC heat generating member. It is not always necessary to set the heating means 37 to the fixing nip portion N. The flexible rotor 35 can be heated by optional heating means from the inside or outside of the rotor 35. It is also possible to constitute the flexible rotor 35 itself so as to generate heat through electromagnetic induction.

(2) The pressure rotor 32 serving as a pressure member is not restricted to a roller. It is also possible to use a rotating endless belt.

(3) An image heating apparatus of the present invention is not restricted to use as the image heating-fixing device of the embodiment. The image heating apparatus is also effective as a temporary fixing device for temporarily fixing an unfixed image to a recording material or image heating apparatus such as a surface reforming apparatus for reforming the image surface property such as luster by reheating a recording material bearing a fixed image. Moreover, it is a matter of course that the image heating apparatus is also effective as a heating apparatus for heating a member to be heated such as a heat press apparatus for removing creases from paper currency, heat laminate apparatus, heating drying apparatus for evaporating moisture from paper currency, or drying heating apparatus used for an ink-jet printer.

The present invention is not restricted to the above embodiment but it includes modifications within technical idea.

This application claims priority from Japanese Patent Application No. 2005-117199 filed Apr. 14, 2005, which is hereby incorporated by reference herein.

What is claimed is:

1. An image heating apparatus comprising:

a flexible sleeve;

a sliding member for sliding on an inner periphery of said flexible sleeve;

a back-up member for forming a nip portion together with said sliding member through said flexible sleeve; wherein a recording material for bearing an image is heated while being held and conveyed *in a moving direction of the recording material* by the nip portion; and a regulation member provided opposing [the] *an* edge surface of said sleeve in a generatrix direction of said sleeve, for regulating a movement of said sleeve in the generatrix direction of said sleeve without rotating, wherein said regulation member has a regulation surface with which the edge surface of said sleeve contacts when said sleeve moves in the generatrix direction, wherein the regulation surface of the regulation member is substantially perpendicular to a [vertical] *virtual* plane including *all of* the nip portion *parallel to the moving direction*, and wherein the regulation surface of said regulation member has a curved-surface area in which a line when the regulation surface is cut in a virtual plane substantially parallel to the nip portion is a curved line convexed toward the edge surface of said sleeve.

2. An image heating apparatus according to claim 1, wherein the curved-surface area of the regulation surface has a shape obtained by cutting a part of a periphery of a virtual elliptic cylinder.

3. An image heating apparatus according to claim 1, wherein the curved-surface area faces the edge surface of an area farthest from an area surrounded by the nip portion of said flexible sleeve in a peripheral direction of said flexible sleeve.

4. An image heating apparatus according to claim 1, wherein said sliding member is a heat generating member.

5. An image heating apparatus according to claim 1, wherein said sleeve has a metallic layer.

6. An image heating apparatus according to claim 1, wherein said back-up member is a driving roller for driving said flexible sleeve.

* * * * *